No. 804,374. PATENTED NOV. 14, 1905.
B. B. BOWERS.
CANDY MACHINE.
APPLICATION FILED SEPT. 21, 1904.
2 SHEETS—SHEET 1.
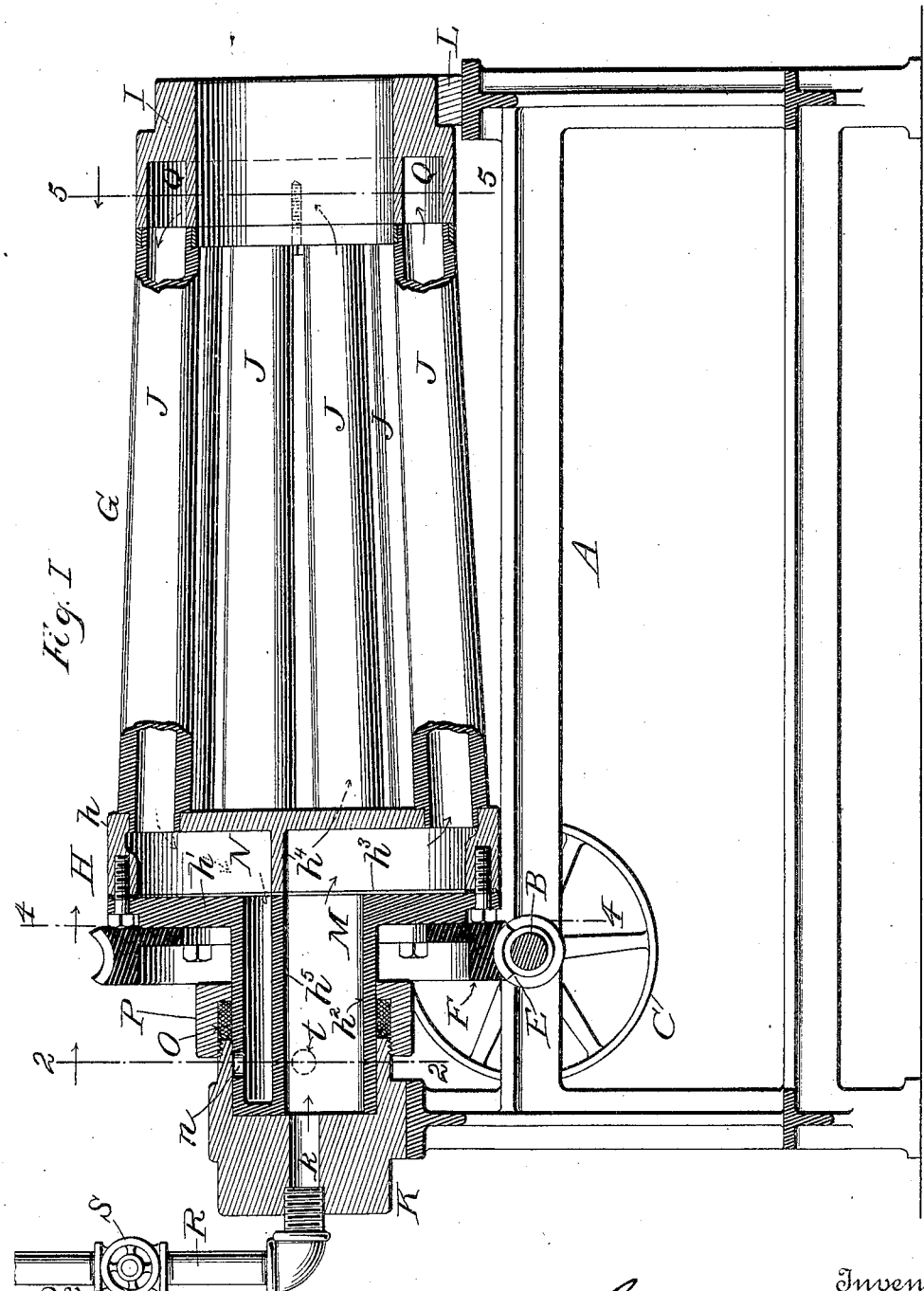

No. 804,374. PATENTED NOV. 14, 1905.
B. B. BOWERS.
CANDY MACHINE.
APPLICATION FILED SEPT. 21, 1904.
2 SHEETS—SHEET 2.
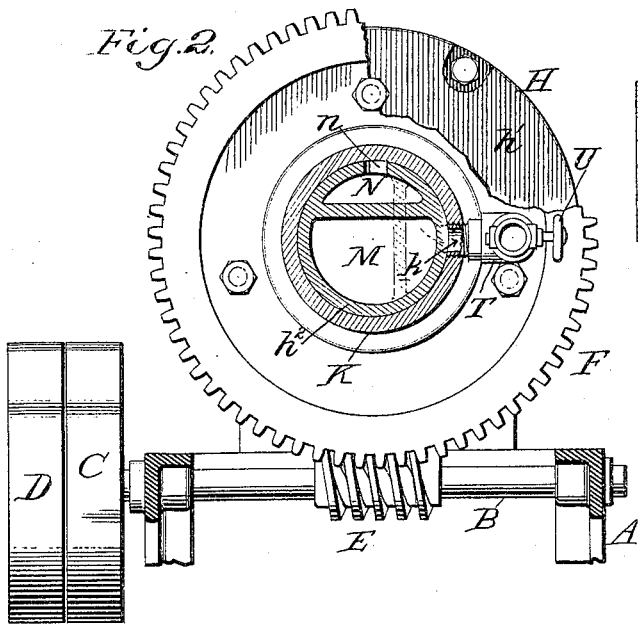
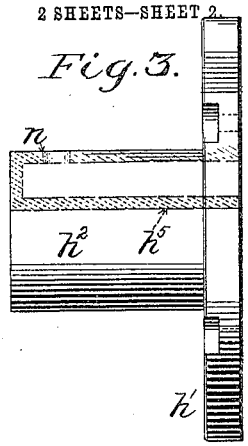
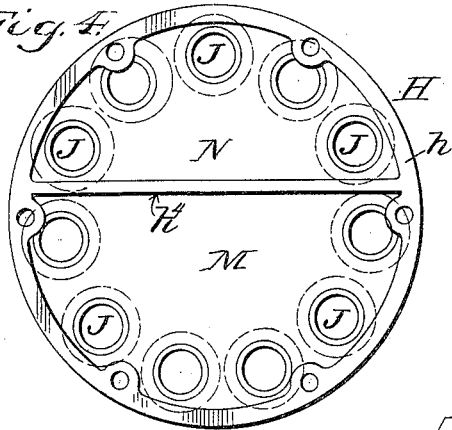
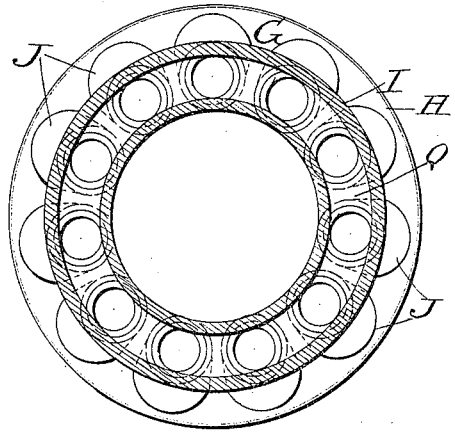
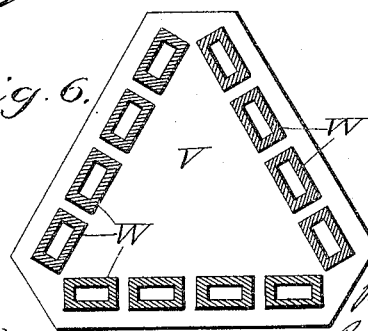
Witnesses
Inventor
Bou B. Bowers
By his Attorneys

UNITED STATES PATENT OFFICE.

BOSE B. BOWERS, OF MACON, GEORGIA.

CANDY-MACHINE.

No. 804,374. Specification of Letters Patent. Patented Nov. 14, 1905.

Application filed September 21, 1904. Serial No. 225,338.

*To all whom it may concern:*

Be it known that I, BOSE B. BOWERS, a citizen of the United States, residing at Macon, in the county of Bibb and State of Georgia, have invented certain new and useful Improvements in Candy-Machines; and I do hereby declare the following to be a full, clear, and exact description of the invention, such as will enable others skilled in the art to which it appertains to make and use the same.

My invention relates to confectionery-machines having a rotary or oscillatory batch-receptacle for working a mass of plastic candy or dough into rounded form or spinning a "neck" which is drawn or pulled out in a continuous length through an axial opening while the batch-receptacle is in motion A modern example of such a machine wherein a horizontally-disposed conical batch-receptacle is operated by oscillatory motion is illustrated, described, and claimed in my pending application for patent, Serial No. 185,060, filed December 14, 1903.

The principal object of my present invention is to keep the batch of plastic candy material warm and in proper consistency or working condition by constantly heating the interior surfaces of the batch-receptacle during its rotary or oscillatory motion, and also to prevent sweating and sticking of the batch by abundant admission and circulation of air around the interior walls of the receptacle.

In the accompanying drawings, which form a part of this specification, the invention is illustrated embodied in a machine having a horizontally-disposed conical batch-receptacle with hollow staves, into which steam, hot water, hot air, or other heating medium is constantly introduced during a rotary motion of such receptacle. It will be understood, however, that the invention is equally applicable to machines in which either an intermittent, oscillatory, or other variation of rotary motion is adopted, or wherein either a cylindrical, polygonal, or other appropriate form of batch-receptacle is employed, and hence is capable of incorporation in various apparatus and susceptible of modifications in details of construction and arrangement of parts.

Without limitation to the specific construction and embodiment shown, the illustrated machine will be fully described, for explanation of the invention, its principle and mode of application; and the invention will then be more particularly pointed out, and defined in the claims following this description.

In said drawings, Figure 1 is a central longitudinal vertical section of the machine. Fig. 2 is a cross-section on line 2 2 of Fig. 1 looking in the direction of the arrow and showing parts behind the line in elevation. Fig. 3 is a detail side view of a detachable part of the hollow cylinder-head at the larger end of the conical batch-receptacle. Fig. 4 is a cross-section on line 4 4 of Fig. 1 looking in the direction of the arrow and showing an end view of the larger end of the receptacle with the detachable part of its head removed. Fig. 5 is a cross-section on line 5 5 of Fig. 1 looking in the direction of the arrow. Fig. 6 is a cross-section through a batch-receptacle of another form.

Letter A denotes the supporting-frame of the illustrated machine; B, a driving-shaft, and C D pulleys thereon, one loose and the other fast for application of power by a belt, which may be shifted from one pulley to the other by any suitable belt-shifter. Shaft B has a screw or worm E engaging a worm-wheel or gear F on the batch-receptacle, so as to rotate the latter when said shaft is driven. This particular driving mechanism may of course be replaced by any appropriate mechanism for imparting to the batch-receptacle the desired motion, whether it be pure rotary, as in the present instance, or oscillatory, intermittent, or other movements which may be adopted for certain purposes. G denotes the said batch-receptacle, which in the present illustration is a horizontally-disposed conical or tapered body comprising a head H, closing its larger end, an annular head I, providing an axial opening in its smaller end, and staves J, connecting said heads. The opposite heads are journaled in suitable bearings K and L, supported on the machine-frame.

The plastic mass or batch to be treated is introduced into the receptacle through the opening in the annular head I, which serves also to permit the neck spun by rotation of the receptacle to be continuously pulled or drawn out. Preferably the batch-receptacle is disposed with its axis approximately horizontal, so that its lower side is not perfectly level, but rises from the larger to the smaller end. This disposition, in conjunction with the conical or tapered shape of the receptacle, facilitates working the batch into a tapered form and spinning out a neck, as well understood by those familiar with the art.

The heads H and I are hollow, and their internal spaces or chambers are connected by the staves J, which are likewise hollow and may consist of tubes having their ends secured in annular series of holes in the confronting faces of the heads. This is to provide for admission and circulation of the heating medium through the staves for heating the interior surfaces of the batch-receptacle. The tubular staves also provide an inner roughened or corrugated surface, which materially aids in working the soft candy-dough and preventing its sticking to the interior of the receptacle.

In the present machine the head H comprises two parts: first, the head proper, in which the ends of the hollow staves are secured, having an annular flange $h$; second, an annular plate $h'$, secured to said flange and having a central hollow journal $h^2$, which is journaled in the bearing K. A packing-ring $h^3$ may be secured between $h$ and $h'$ to make a fluid-tight joint. The head proper has a partition $h^4$ across its outer side, preferably to one side of the center, and the journal $h^2$ has a similar partition $h^5$, meeting $h^4$ in a fluid-tight joint. Thus the whole head is divided into two distinct chambers, of which the larger one M is a steam-inlet chamber and the smaller one N an exhaust-chamber, and in view of the separate staves or tubes connecting and communicating with the heads the whole shell of the receptacle is likewise divided into two distinct passages. An annular packing ring or gland P is shown surrounding the journal $h^2$ and screwed onto the inner end of bearing K and containing a packing O, so as to form a stuffing-box or fluid-tight joint. The opposite head I is also shown comprising two parts: first, the head proper, which is journaled on the bearing L and has an annular chamber Q, open at the inner face of said part; second, an annular plate in which the ends of the hollow staves are secured, covering said chamber and secured to the main part of the head.

Steam or other heating medium is supplied from a suitable source and conveyed through the supply-pipe R and passage $k$ into the chamber M of the hollow head H. By means of a cut-off valve S in the supply-pipe the heat and pressure furnished may be controlled. Now a number of the hollow staves J are in communication with chamber M, while the remaining number are shut off therefrom and communicate with the exhaust-chamber N. Hence the steam passes from chamber M through the communicating pipes or staves into the annular chamber O in the opposite head I and thence back through the remaining staves into the exhaust-chamber N. Said exhaust-chamber has a port or ports adapted to register at intervals with an outlet port or ports in bearing K. As shown, a single port $n$ registers once in every revolution with a port $t$, leading into a steam-exhaust pipe T. This exhaust-pipe is also provided with a cut-off valve U, so as to hold the heat if needed. Thus the hollow passages, constituting a surrounding jacket for the batch-receptacle, can be constantly supplied with the heating medium during the continuous operation of the machine and the supply can be effectively and economically controlled as to the amount admitted, the pressure, and the time or extent of use. By this means the plastic batch can be kept at proper temperature and consistency for best working condition. At the same time the batch is prevented from sweating by virtue of the abundant supply of fresh cool air admitted through the longitudinal spaces between the staves, which are close enough together to hold and work the material efficiently, while yet leaving such spaces or cracks for passage of the air. For this reason, as well as for their further function of offering a corrugated inner surface to the batch, it is desirable to have the receptacle made of spaced staves in this manner; but the scope of my invention in its broadest aspects is such as to include also the use of a receptacle with an ordinary closed shell or wall and with a surrounding jacket for the steam or heating medium.

As a heating medium steam, hot water, hot air, or other suitable heated fluid may be used, though preferably steam. It is highly economical to utilize for this purpose the exhaust-steam from a steam engine or boiler—for example, the same engine which furnishes power for driving the candy-machine itself.

The described arrangement of steam chambers and passages is a valuable feature of my invention, placing both steam-pipes in communication with the larger cylinder-head, avoiding such connections at the opposite head, simplifying the general construction, rendering the structure easier to set up or take apart, and providing better and more convenient control of the heating medium. However, I do not confine myself to such construction except as distinctly claimed, for in some instances the steam may be conducted through the whole series of staves and exhausted from the smaller head of the receptacle, and other modifications may be made with respect to the admission and exhaust passages.

As hereinbefore stated, the batch-receptacle may be either round or conical, as shown, or triangular or of other desirable form in cross-section. A receptacle of triangular cross-section is represented in Fig. 6, wherein V denotes its larger head, and W its staves, which are preferably flat on their inner faces to provide flat interior sides for the receptacle. When this type of receptacle is used, I prefer to operate it by intermittent motion or alternate one-third rotations and intervening rests, each interval of rest occurring while a flat side of the triangular receptacle is down, as in the figure.

In the following claims the word "rotatory" is used to signify either rotary, oscillatory, intermittent, or other variation of rotary movement, the main principles of my invention being applicable to machines operating with any one of such motions.

I claim as my invention and desire to secure by Letters Patent of the United States—

1. A candy-machine having, in combination, a horizontally-disposed rotary batch-receptacle closed at one end and having an axial opening in its opposite end for drawing out a neck of candy material during motion of said receptacle, the shell of said receptacle being hollow to provide a surrounding chamber for a heating medium, and a supply-pipe for the heating medium having an axial communication with said chamber at the closed end of the batch-receptacle for supplying heating medium thereto during motion of said receptacle.

2. A candy-machine having, in combination, a horizontally-disposed rotary batch-receptacle closed at one end and having an axial opening in its opposite end for drawing out a neck of candy material during motion of said receptacle, the shell of said receptacle being hollow to provide a surrounding chamber for a heating medium, and a supply-pipe for the heating medium having an axial communication with said chamber at the closed end of the batch-receptacle for supplying heating medium thereto during motion of said receptacle, a cock or valve for controlling the supply of heating medium to the chambered shell, and means for exhausting the medium from said shell during motion of said receptacle.

3. A candy-machine having, in combination, a rotary horizontally-disposed batch-receptacle having a hollow or chambered shell and a communicating hollow head closing one end and an opposite annular head providing an axial opening for drawing out a neck of plastic candy material during motion of said batch-receptacle, and a feed-pipe for supplying a heating medium to the hollow or chambered shell having an axial swivel connection with said hollow head.

4. A candy-machine having, in combination, a rotary horizontally-disposed batch-receptacle having a hollow journal at one end and a hollow shell communicating with said journal and an axial opening in its opposite end for drawing out a neck of candy material during motion of said receptacle, the said hollow journal and shell being internally divided into two distinct passages communicating at the open end of the receptacle, a pipe axially connected with said hollow journal for supplying heating fluid to one of such passages, and means for exhausting such fluid from the other passage through the same hollow journal.

5. In a candy-machine, a rotatory batch-receptacle having a hollow or chambered shell divided as a whole into two distinct communicating passages, and means for supplying a heating medium to one of said passages and exhausting it from the other.

6. In a candy-machine, a rotatory batch-receptacle comprising hollow heads and a connecting hollow or chambered shell, one of said heads being divided into inlet and exhaust chambers for a heating medium, and the shell being divided into passages for conveying the heating medium from said inlet-chamber to the opposite head and back to the exhaust-chamber, and a supply-pipe communicating with said inlet-chamber for introduction of the heating medium.

7. In a candy-machine, a rotary horizontally-disposed batch-receptacle for working plastic candy material having hollow passages in its shell for a heating medium and open spaces between said passages for admission of air to the batch.

8. In a candy-machine, a rotary horizontally-disposed batch-receptacle for working plastic candy material having a closed head, an opposite open head for drawing out a neck of candy during motion of the receptacle, and a connecting-shell composed of tubes for holding a heating medium and affording intervening open spaces for admitting air between the tubes to the batch, and means for supplying a heating medium to said tubes during motion of said receptacle.

9. In a candy-machine, a rotatory horizontally-disposed batch-receptacle having a hollow closed head, an opposite annular or open head for drawing out the neck of candy during motion of said receptacle, and a shell comprising a series of longitudinal hollow staves secured to and communicating with said hollow head, and means for supplying said hollow head with steam or other heating medium for transmission through said staves.

10. In a candy-machine, a rotatory batch-receptacle comprising hollow heads and hollow staves connecting them, and means for supplying one of said heads with steam or heating medium during operation of the receptacle, and means for intermittently exhausting the heating medium.

11. In a candy-machine, a rotatory batch-receptacle comprising hollow heads and hollow staves connecting them, one of said heads being divided into inlet and exhaust chambers for steam or other heating medium, and means for supplying such medium to said inlet-chamber during operation of the receptacle.

12. In a candy-machine, a rotatory longitudinally-disposed batch-receptacle, the same comprising a hollow head closing one end and an annular hollow head at the other end and hollow staves connecting them, the hollow head at the closed end having a hollow journal in communication with a source of heat-supply, and having also a separate exhaust-chamber therein in communication with a number of the staves while the other staves are in communication with the supply-chamber.

13. In a candy-machine, a rotatory batch-receptacle comprising hollow heads and hollow staves connecting them, all adapted to hold a heating medium, and the staves being spaced apart to permit entrance of air to the batch.

In testimony whereof I affix my signature in presence of two witnesses.

BOSE B. BOWERS.

Witnesses:
L. D. MOORE,
OLIVER ORR.